United States Patent Office 2,742,111
Patented Apr. 17, 1956

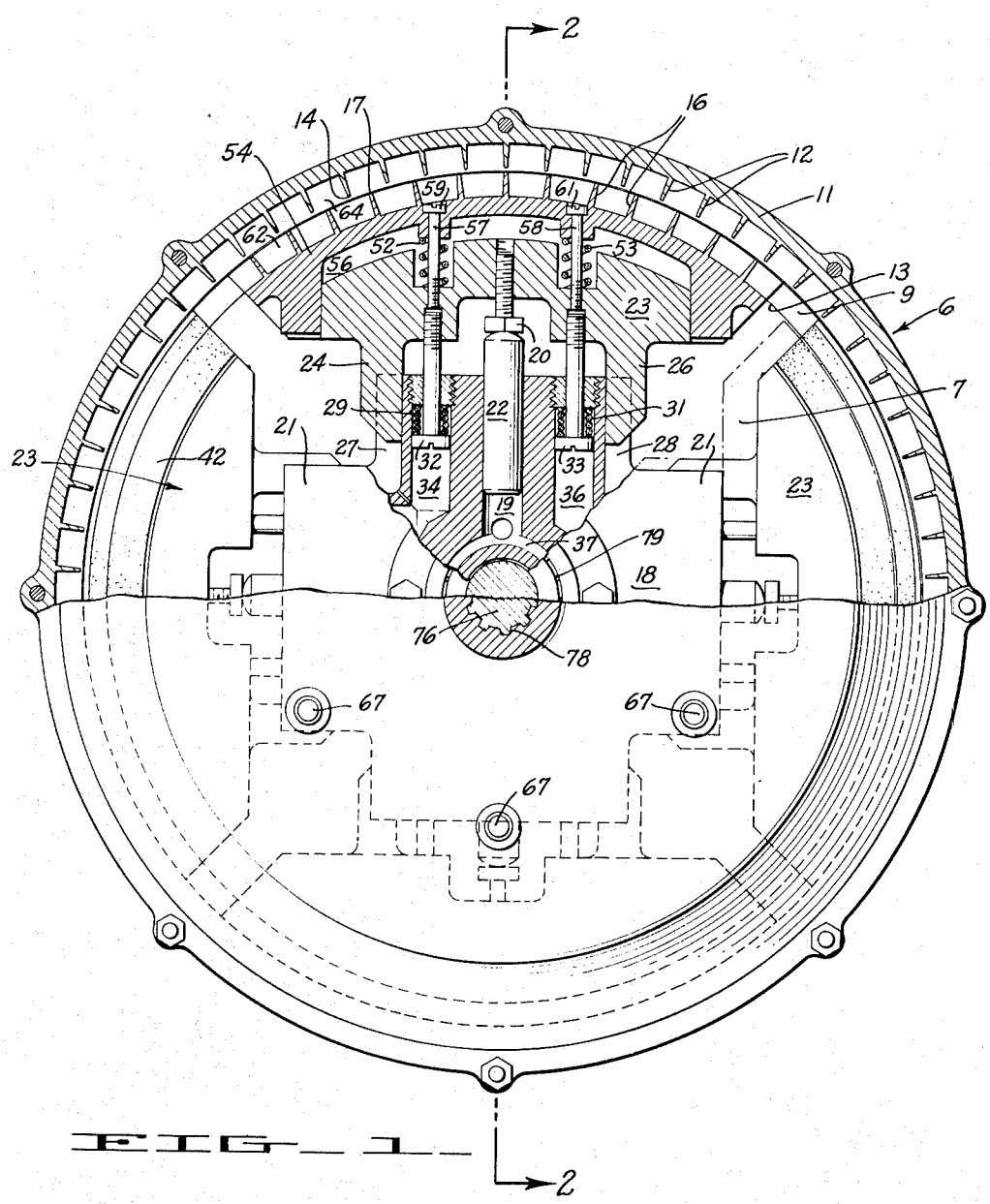

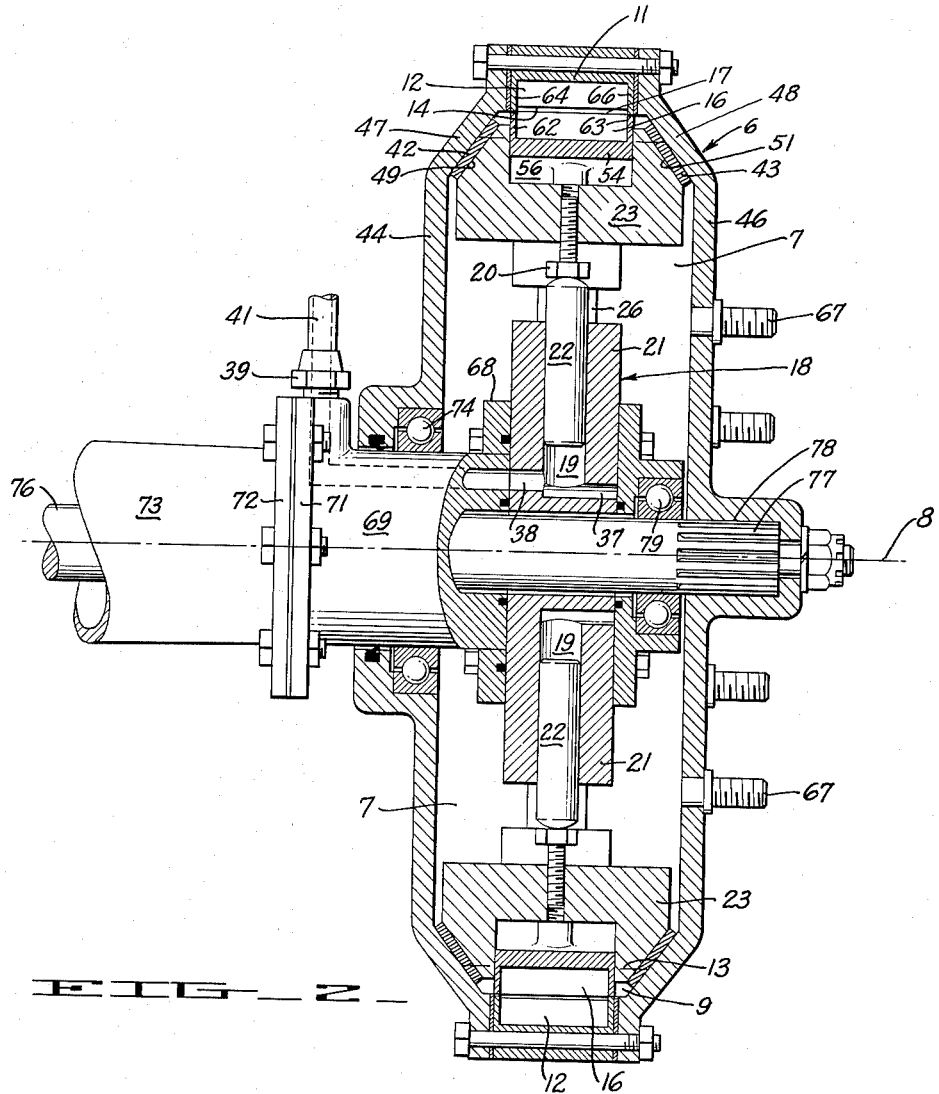

2,742,111
VARIABLE TORQUE TRANSMITTING DEVICE

Charles L. Hagerty, Daly City, Calif.

Application December 10, 1952, Serial No. 325,195

10 Claims. (Cl. 188—86)

The invention relates to fluid coupling, torque transmitting devices and in the application of such devices to brake mechanisms.

An object of the present invention is to provide a variable torque transmitting device of the character described which will have a wide range of torque transmission from a no-load, or free-running, condition to full coupling and wherein, and as a particularly important feature of the invention, there will be a minimum energy loss in free-running condition and elimination of fluid coupling in such condition.

Another object of the present invention is to provide an improved combination of fluid and mechanical couplings coacting to utilize the maximum effectiveness of fluid couplings at high speeds and positiveness of mechanical coupling at low speeds and in an arrangement providing a smooth and continuous increase in effectiveness of the coupling between no-load and full load conditions.

A further object of the invention is to provide a torque transmitting device which is particularly designed for vehicle brakes and which, when applied thereto, will provide greatly improved braking action at high speed without overheating or fading and will bring the vehicle to a more rapid and smoother stop without locking or grabbing of the brakes and which will be more durable and lasting in use.

The invention possesses other objects and features of advantage, some of which, with the foregoing, will be set forth in the following descriptions of the preferred form of the invention which is illustrated in the drawings accompanying and forming part of the specification. It is to be understood, however, that variations in the showing made by the said drawings and description may be adopted within the scope of the invention as set forth in the claims.

Referring to said drawings:

Figure 1 is a side elevational view of a variable torque transmitting device constructed in accordance with the present invention with a portion of the outer case broken away and certain of the interior parts shown in cross section for clarity of illustration.

Figure 2 is a cross sectional view of the device illustrated in Figure 1 and is taken substantially on the plane of line 2—2 of Figure 1.

The device, as illustrated in the drawings, consists briefly of a fluid tight casing 6 providing an interior chamber 7 formed symmetrical to a central axis 8 through the casing about which the casing is adapted to be rotated so as to contain fluid 9 therein centrifugally against a circumferential wall 11 of the casing concentric to the axis 8. A plurality of vanes 12 are carried by the casing and extend interiorly from the wall 11 and, as will be best seen from Figure 1, the fluid content is sufficient to cover these vanes when the fluid is centrifugally supported in a layer against the wall 11 so that the interior cylindrical surface 13 of the fluid will be spaced radially inwardly from the inner ends 14 of the vanes 12. Mounted within the chamber 7 and retained therein for relative rotation with respect to the casing 6 are a second set of vanes 16 which, in accordance with the present invention, are mounted for radial movement between a retracted position spaced inwardly from the fluid surface 13, and accordingly being entirely free from contact with the fluid, and a relatively outwardly extended position projecting into the fluid layer. As will be understood, entry of the vanes 16 into the fluid layer will be accompanied by a transmission of torque between the casing and the second vanes, and such torque transmission will become increasingly effective as the vanes 16 are moved to their fully extended position, as illustrated in the drawings, wherein the outer ends 17 of the vanes are in closely spaced relation to the ends 14 of the vanes 12.

Means for supporting and displacing the vanes 16 between their retracted and extended positions here includes a hub 18 mounted within the casing centrally of the axis 8 and having a plurality of radially extending, hydraulic cylinders 19 formed in boss portions 21. Pistons or rams 22 are mounted for radial reciprocation in the cylinders 19 and bear at their outer ends (via adjustment screws 20) upon vane supporting members 23 which are formed with guide extensions 24 and 26 retained for radial reciprocation in guide grooves 27 and 28 in the outer sides of the bosses 21. Any number of units, each composed of a vane member 23 and hydraulic actuator therefor, may be set in circumferentially spaced relation around the hub. Four of such units are here shown, with one illustrated in cross section, a description of which will suffice for all. The members 23 are normally held in their radially inward or retracted position by means of helical springs 29 and 31 mounted in compression between pins 32 and 33, and the boss 21, the pins being reciprocally carried in radial bores 34 and 36 in the bosses and being secured to the members 23. The several cylinders 19 are interconnected by an annular passage 37, which is, in turn, connected by passage 38 to an externally mounted fitting 39 for a hydraulic fluid supply line 41. As will be understood, the application of fluid under pressure through line 41 and the connected passages to the cylinders 19 will cause the several members 23 to move radially outwardly against the resistance of springs 29 and 31 to the fully extended position of the vanes 16, as above described.

As an important feature of the present invention there is combined with the fluid coupling, as above described, a mechanical friction brake, which is put into operation after the vanes 16 have been moved outwardly to their extended and most effective position so as to obtain the positiveness of a mechanical coupling as an end product of the fluid coupling. This is here accomplished by the provision of brake shoes 42 and 43 on the members 23 and which are moved therewith into frictional engagement with the casing 6 upon movement of the members to their outer extended positions. As will be best seen in Figure 2, the casing 6 is composed of a pair of substantially radially extending side walls 44 and 46, which are joined at their outer extremities with the circumferential wall 11 and adjacent thereto are formed with outwardly converging, tapered portions 47 and 48, which provide opposed frusto-conical braking surfaces. In conformity with the shape of the casing, the members 23 are likewise preferably formed with opposed outwardly converging surfaces 49 and 51 upon which the shoes 42 and 43 may be mounted so that the latter are oriented and positioned for full face mating engagement with the braking areas provided by the wall portions 47 and 48.

As a further feature of the present construction and facilitating the inter-action of the fluid and mechanical coupling herein used, as well as providing other operational advantages, the vanes 16 are mounted for reciprocation with respect to their carrier members 23 and coacting with such movement is the combination of springs 52 and 53 which constantly urge the outward positioning of the vanes 16 while at the same time yieldably permitting their inward movement, and means for limiting the outward movement of the vanes. This latter means is preferably embodied in a form relating the outer positioning of the vanes with respect to the casing and the vanes 12 so that a clashing of the vanes is positively avoided in the event that wear or failure of the brake shoes 42 and 43 would permit an outward movement of the members beyond their normal extended positions. Also, ability of the vanes to yieldably reciprocate adds flexibility and smoothness to the operation of the device. As here shown, the vanes 16 are made up in sections or blocks to provide circumferential segments 54 which are mounted and confined for radial reciprocation in recesses 56 provided in the members 23. Springs 52 and 53 are compressed between the member 23 and the segments 54 to constantly urge the outer extension of the segments. Pins 57 and 58 are used to retain the segments 54 and members 23 in assembled relation, and as here shown in Figure 1, these pins are threaded at their inner ends in the member 23 and are slidably mounted through openings provided in the segments and are formed with enlarged heads 59 and 61 for retaining the segments in a maximum outwardly extended position with respect to the member 23 against the action of springs 52 and 53. The aforementioned stop means for preventing clashing of the vanes upon wear or failure of the shoes 42 and 43 is here provided by forming upon the segments 54 rim portions 62 and 63 which are aligned with and will engage similarly formed rim portions 64 and 66 provided by the vanes 12. Normally a clearance is maintained between these opposed rim portions in the maximum extended position of the inner vanes. However, should the shoes 42 and 43 wear or otherwise permit a further outward movement of the member 23, the opposed rims will contact to prevent clashing of the vanes.

The device as illustrated in the accompanying drawing, is particularly designed as a brake mechanism for an automotive vehicle. Accordingly, the side wall 46 of the casing is provided with a plurality of circumferentially spaced studs 67 for mounting of a vehicle wheel with the wheel and casing secured in concentric co-axial alignment for joint rotation about the axis 8. The hub 18 is arranged to be solidly secured to the frame of the vehicle and for this purpose it is here bolted to a flanged end 68 of a tubular axle housing extension 69 projecting axially through the side wall 44 of the casing and being provided externally thereof with a flanged end 71 arranged for bolting to the flanged end 72 of the vehicle axle housing 73, the latter being supported by the vehicle frame against rotation. Rotation of the casing about the housing extension 69 as a center is here provided by bearing 74 mounted between these parts and rotation of the casing is adapted to be effected by the drive axle 76 of the vehicle, which extends through the housings 73 and 69 and is splined at its end 77 in a socket 78 provided by the casing wall 46. The embodiment illustrated is for a power driven wheel. Where it is to be applied to a free running wheel, the drive shaft will, of course, not be present and the mechanism modified accordingly. A second bearing 79 is provided between the axle 76 and the hub, for added support.

From the foregoing, the operation of the unit will be clear and is summarized as follows. During the rotation of the casing 6, the fluid contained therein will be centrifugally supported in a layer around the outer periphery of the casing and upon the circumferential wall 11, fully covering the vanes 12 and extending somewhat inwardly therefrom to provide an annular layer as indicated by the fluid line 13. In the no-load or decoupled position of the device, the inner vanes 16 are retained in a radially inwardly retracted position by springs 29 and 31 so as to be removed from the fluid. This retracted position is shown in dotted lines in Figure 1. In this position, as will be understood, the device is completely free running and without any fluid coupling whatsoever, the only resistance to movement being offered by the anti-friction bearings 74 and 79. Coupling is effected by introducing fluid under pressure through conduit 41 and into hydraulic cylinders 19 for radial outward displacement by pistons 22 of the vane supporting members 23. As these members are moved outwardly, the outer ends 17 of the vanes 16 will pierce the fluid surface 13 and initiate fluid coupling between the rotating casing and the stationary hub. As the outward movement of these vanes continues, the coupling is rendered more effective until the vanes reach their extended position, when full fluid coupling is obtained. At that point, brake shoes 42 and 43, carried by the members 23, move into frictional engagement with the casing and apply a mechanical braking action. Thus there is obtained a continuously increasing effectiveness throughout the full range of fluid and mechanical coupling. Furthermore, as will be understood, the fluid coupling has its maximum effectiveness at high speeds when mechanical braking is least desirable, while the mechanical coupling provides a positiveness at low speeds and for parking when fluid coupling is least effective. Accordingly, when applied to vehicle braking, the present device will be effective at high speed without undue heating or fading and will bring the vehicle to a smoother stop without locking or grabbing. The parts are illustrated in the drawing as they would appear with the brakes fully applied. During rotation of the casing, the fluid will assume an annular form as indicated by the fluid surface 13 in Figure 1, while, when the wheel is at rest, the fluid will assume a level only partially filling the lower portion of the casing. Oil, or other liquid as conventionally used in fluid couplings for automotive drives, may be used in the present device.

I claim:

1. A variable torque transmitting device comprising, a drive member consisting of a casing providing a chamber concentric to a central axis and being mounted for rotation about said axis for containing a drive fluid centrifugally in an annular layer in said casing, interiorly projecting vanes carried by said casing for extending inwardly into said layer, a member mounted within said chamber for relative rotation and being supported for radial movement between a retracted position spaced inwardly from said vanes and layer to an outwardly extended position, outwardly projecting vanes mounted on said member for movement therewith into and out of said layer to provide torque transmission between said casing and said member and to be increasingly effective upon movement of said member from retracted to extended positions, means for displacing said member between said retracted and extended positions, and means providing a frictional engagement between said casing and member in said extended position.

2. A variable torque transmitting device comprising, a drive member consisting of a fluid tight casing having a wall symmetrical to a central axis and being mounted for rotation about said axis for containing fluid centrifugally against said wall, first vanes carried by said casing adjacent to and extending interiorly from said wall, fluid in said casing in an amount covering said vanes when centrifugally supported against said wall and providing an interior fluid surface spaced radially inwardly from said vanes, second vanes mounted within said casing for relative rotation and being supported therein for movement between a retracted position spaced inwardly from said fluid surface and a relatively outwardly extended position projecting into said fluid to provide torque transmission between said casing and second vanes and to be increasingly effective upon movement of said second vanes from retracted to extended position, means for displacing said second vanes between said retracted and extended positions, and means movable with said second vanes and into frictional engagement with said casing in said extended position.

3. A variable torque transmitting device comprising, a drive member consisting of a fluid tight casing formed symmetrical to a central axis and having substantially radially extending side walls and a circumferential wall concentric to said axis for containing a drive fluid centrifugally in a layer in said casing, means mounting said casing for rotation about said axis, first vanes carried by said casing and extending interiorly from said circumferential wall, second vanes mounted within said casing for relative rotation and being supported therein for movement between a retracted position spaced radially inwardly from said layer and a relatively outwardly extended position projecting into said layer adjacent said first vanes to cooperate therewith and with said fluid to provide torque transmission between said casing and second vanes and to be increasingly effective upon movement of said second vanes from retracted to extended position, means for displacing said second vanes between said retracted and extended positions, and means movable with said second vanes and into frictional engagement with one of said radially extending side walls in said extended position.

4. A variable torque transmitting device comprising, a drive member consisting of a fluid tight casing formed symmetrical to a central axis and having substantially radially extending side walls and a circumferential wall concentric to said axis for containing a drive fluid centrifugally in a layer in said casing, means mounting said casing for rotation about said axis, first vanes carried by said casing and extending interiorly from said circumferential wall into said layer, a member mounted within said casing for relative rotation and being supported therein for movement between radially retracted and extended positions, outwardly projecting second vanes mounted on said member for movement therewith out of and into said layer in said retracted and extended positions respectively and cooperative with said first vanes and said fluid to provide torque transmission between said casing and member and to be increasingly effective upon movement of said member from retracted to extended position, means for displacing said member between said retracted and extended positions, said radially extending side walls being formed with outwardly converging portions, and brake shoes carried by said member and arranged in outwardly converging fashion and positioned so as to frictionally engage said wall portions in said extended position.

5. A combination fluid and mechanical brake comprising, a fluid tight casing formed symmetrical to a central axis and having substantially radially extending side walls and a circumferential wall concentric to said axis, one of said side walls being adapted for concentric attachment to a wheel to be braked for rotation with said wheel about said axis, first vanes carried by said casing and extending interiorly from said circumferential wall, a hub mounted within said casing and restrained therein against rotation, a plurality of circumferentially spaced members carried by said hub for movement between radially retracted and extended positions, second vanes mounted on each of said members and cooperative with said first vanes and said fluid to provide a braking action between said casing and hub and to be increasingly effective upon movement of said members from retracted to extended position, means for displacing said members between said retracted and extended positions, and brake shoes carried by said members and positioned to frictionally engage said casing in said extended position.

6. A combination fluid and mechanical brake of the character defined in claim 5 wherein said second vanes are mounted for radial reciprocation on said members and wherein said device is provided with means limiting the outward movement of said second vanes, and spring means connected to said members and said second vanes for urging the latter outwardly but yieldably permitting inward movement thereof.

7. A variable torque transmitting device comprising, a drive member consisting of a casing providing a chamber concentric to a central axis and being mounted for rotation about said axis for containing drive fluid centrifugally in an annular layer in said chamber, internally projecting vanes carried by said casing for extending inwardly into said layer, a member mounted within said chamber for relative rotation and being supported for radial movement between a retracted position spaced inwardly from said vanes and layer to an outwardly extended position in frictional engagement with said casing, and outwardly projecting vanes mounted for radial reciprocation on said member for movement therewith into and out of said layer to provide torque transmission between said casing and member.

8. A variable torque transmitting device comprising, a drive member consisting of a casing providing a chamber concentric to a central axis and being mounted for rotation about said axis for containing drive fluid centrifugally in an annular layer in said chamber, internally projecting vanes carried by said casing for extending inwardly into said layer, a member mounted within said chamber for relative rotation and being supported for radial movement between a retracted position spaced inwardly from said vanes and layer to an outwardly extended position in frictional engagement with said casing, outwardly projecting vanes mounted for radial reciprocation on said member for movement therewith into and out of said layer to provide torque transmission between said casing and member, and spring means normally urging said last named vanes outwardly relative to said member.

9. A combination fluid and mechanical brake comprising, a fluid tight casing formed symmetrically to a central axis and having a substantially radially extending sidewall formed for attachment to a wheel for rotation about said axis, interiorly projecting vanes carried by said casing, drive fluid in said casing centrifugally driven by said vanes into an annular layer extending interiorly of said vanes, a hub mounted in said casing interiorly of said fluid layer and restrained therein against rotation, a plurality of circumferentially spaced members mounted for radial reciprocation on said hub between a retracted position interiorly of said layer and an extended position in frictional engagement with said casing, outwardly projecting vanes mounted for radial reciprocation on said members for movement therewith into and out of said layer to provide torque transmission between said casing and members, spring means normally urging said last named vanes outwardly relative to said members, said hub being formed with a plurality of radially extending hydraulic cylinders communicating with a common supply passage, and a plurality of pistons mounted for reciprocation in said cylinders and connected to said members for displacing said members and vanes carried thereby between retracted and extended positions.

10. A variable torque transmitting device comprising, a drive member consisting of a casing providing a chamber concentric to a central axis and being mounted for rotation about said axis for containing drive fluid centrifugally in an annular layer in said chamber, internally projecting vanes carried by said casing for extending inwardly into said layer, a member mounted within said chamber for relative rotation and being supported for radial movement between a retracted position spaced inwardly from said vanes and layer to an outwardly extended position in frictional engagement with said casing, outwardly projecting vanes mounted for radial reciprocation on said members for movement therewith into and out of said layer to provide torque transmission between said casing and member, spring means normally urging said last named vanes outwardly relative to said member, and means associated with the two sets of vanes and formed for limiting the outward movement of said outwardly projecting vanes to prevent clashing thereof with said internally projecting vanes.

References Cited in the file of this patent

UNITED STATES PATENTS

| | | |
|---|---|---|
| 1,756,904 | Jack | Apr. 29, 1930 |
| 2,400,186 | Armentrout | May 14, 1946 |